United States Patent [19]

Janowicz

[11] Patent Number: 4,886,861

[45] Date of Patent: Dec. 12, 1989

[54] MOLECULAR WEIGHT CONTROL IN FREE RADICAL POLYMERIZATIONS

[75] Inventor: Andrew H. Janowicz, Wilmington, Del.

[73] Assignee: E. I. DuPont de Nemours and Company, Wilmington, Del.

[21] Appl. No.: 39,092

[22] Filed: Apr. 16, 1987

Related U.S. Application Data

[63] Continuation-in-part of Ser. No. 726,238, Apr. 23, 1985.

[51] Int. Cl.⁴ .......................... C08F 2/38; C08F 20/18
[52] U.S. Cl. .................................. 526/145; 526/147; 526/161; 526/166; 526/329.7
[58] Field of Search ......................................... 526/145

[56] References Cited

U.S. PATENT DOCUMENTS

| | | | |
|---|---|---|---|
| 3,160,618 | 12/1964 | Delacretaz | 526/193 |
| 3,222,335 | 12/1965 | Delacretaz | 526/193 |
| 3,262,995 | 7/1966 | Huff | 526/193 |
| 3,272,786 | 9/1966 | Perry | 526/193 |
| 3,846,383 | 11/1974 | Uyama et al. | 526/172 |
| 3,860,568 | 1/1975 | Chabert et al. | 526/135 |
| 4,526,945 | 7/1985 | Carhan et al. | 526/145 |
| 4,680,352 | 7/1987 | Janowicz et al. | 526/131 |
| 4,680,354 | 7/1987 | Lin et al. | 526/172 |

FOREIGN PATENT DOCUMENTS 824312 11/1959 United Kingdom ................ 526/217

OTHER PUBLICATIONS

Burczyk et al, Journal of Polymer Sciences, Polymer Chemistry Ed, vol. 22, pp. 3255–3262 (1984).
Enikolopyan et al, Journal of Polymer Sciences, Polymer Chemistry Ed., vol. 19, pp. 879–889 (1981).

Primary Examiner—Edward J. Smith

[57] ABSTRACT

Free radical polymerization processes employing cobalt(II) chelates of vicinal iminohydroxyimino- and dihydroxyiminoalkanes, N,N'-bis(salicylidene)ethylenediamines and porphyrins as catalytic chain transfer agents, in admixture with certain Lewis bases, for controlling the molecular weight of the homopolymers and copolymers produced.

13 Claims, No Drawings

MOLECULAR WEIGHT CONTROL IN FREE RADICAL POLYMERIZATIONS

CROSS-REFERENCE TO RELATED APPLICATIONS

This application is a continuation-in-part of co-pending and commonly-assigned U.S. Ser. No. 726,238 filed on Apr. 23, 1985, now abandoned.

BACKGROUND OF THE INVENTION

1. Field of the Invention

This invention relates to styrene and acrylic free radical polymerization processes employing cobalt(II) chelates of vicinal iminohydroxyimino- and dihydroxyiminoalkanes, N,N'-bis(salicylidene)-ethylenediamines and porphyrins as catalytic chain transfer agents for controlling the molecular weight of the styrene and acrylic homopolymers and copolymers produced.

2. Background

In any polymerization process it is necessary to be able to control the molecular weight of the polymer produced so that it may be fitted to a particular use or need. For example, in unperturbed polymerization systems which fundamentally tend to produce high molecular weight polymers, it may be desirable or necessary to limit the molecular weight of the polymers produced, and this must be done in a predictable and controllable fashion. Such molecular weight limitation may be desirable or necessary in the preparation of polymer solutions for use in paints and finishes which require high solids contents to assure reduced solvent emission during application, and yet which require low viscosity to facilitate ready application.

In free radical polymerizations there are several conventional means of effecting such molecular weight limitation, but all have notable disadvantages. These include:

(1) The use of a high initiator/monomer ratio, but this is costly in terms of initiator consumption.

(2) Polymerizing at high temperatures, for example, about 150° C., which is undesirably energy intensive.

(3) Adding stoichiometric amounts of thiol chain transfer agents to the polymerizing system, but the attendant incorporation of sulfur-containing agents into the polymer renders it less durable than is desired.

Catalytic chain transfer to the monomer as a means of controlling molecular weight in the radical polymerization of methyl methacrylate and styrene in the presence of cobalt(II) porphyrin complexes is known in the art. N.S. Enikolopyan et al., J. Polym. Sci., Polym. Chem. Ed., Vol. 19, 879 (1981), describe the kinetics and the molecular weight control achieved in the free radical polymerization of methyl methacrylate in the presence of a cobalt complex of hematoporphyrin tetramethyl ether. This use of this cobalt complex is also discussed by B. R. Smirnov et al. in Vysokomol. soyed., A23, No. 5, 1042 (1981) and by B. R. Smirnov et al. in Dokl. Akad. Naud SSSR, 253, 891 (1980). In a similar study, B. R. Smirnov et al., Dokl. Akad. Nauk SSSR, 254, 127 (1980), describe studies carried out with hematoporphyrin tetramethyl ester. The authors conclude that only the combination of cobalt with a tetrapyrrole porphyrin ligand apparently permits the realization of catalysis of chain transfer to the monomer, and that it has been ruled out that analogous phenomena will be discovered during the investigation of complexes similar in spatial and electronic structure to the porphyrins, such as phthalocyanines, corrins, cobaloximes, etc. B. R. Smirnov et al., Vysokomol. Soyed., A23, No. 11, 2588 (1981), describe the catalytic chain transfer observed in the radical polymerization of styrene in the presence of a cobalt complex of hematoporphyrin IX tetramethyl ester.

U.S. Pat. No. 4,526,945, issued to Carlson, discloses a process comprising polymerizing monomer, especially including methacrylate monomer, in the presence of a azo catalyst and between 0.0001% and 0.01% of Cobalt-(II) dimethylglyoxime pyridine or similar Cobalt(II) complexes to produce low molecular weight polymer or copolymer.

D. E. Pashchenko et al., Dokl. Akad. Nauk SSSR, 265, 889 (1982), describe chain transfer studies with cobalt porphyrins in the polymerization of methyl methacrylate. Regarding this paper, it is not understood what is meant by "cobalt complexes of porphyrins and cobaloximes" since there is no further mention of "cobalozimes" in the English language version of the paper; moreover, the term "cobalozimes" does not appear in the original Russian test, but rather the term "cobalamines", which are vitamin B12-related structures similar to the porphyrin structures disclosed in this paper and in the other publications cited above.

Although the use of the porphyrin complexes circumvents many of the problems associated with the aforesaid conventional commercial processes, the complexes impart too much color to the final product, rendering it useless or less desirable in many applications, such as in certain paints and finishes. Moreover, the cost of the porphyrin complex is rather high.

A. F. Burczyk et al., J. Polym. Sci., Polym. Chem. Ed., Vol. 22, 3255 (1984), disclose that cobaloximes, that is, bisdimethylgoloximatocobalt complexes, are often used as analogs of cobalt porphyrins in research studies, and they further disclose the use of cobalozime, synthesized from Co(II) acetate and dimethylglyoxime, as a relatively cheap chain transfer agent in the free radical polymerization of methyl methacrylate. The cobalozime of Burczyk et al. is shown on page 3256 as being of the formula

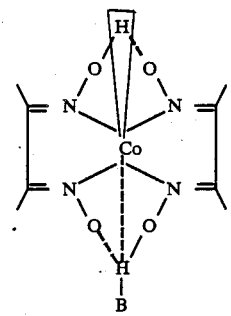

wherein B is a coordinating base ligand, such as triphenylphosphine. Stucture Va which constitutes a part of the invention which is disclosed and claimed herein reads on the cobalozime of Burczyk et al. Similar disclosures are made by A. F. Burczyk in a thesis to the University of Waterloo, Waterloo, Ontario, 1984.

U.S. Pat. No. 3,262,995, issued to Huff et al., discloses preparation of block polymers of acrylonitrile and α-substituted acrylonitriles and vinyl aromatic monomers such as styrene. The vinyl aromatic monomers are polymerized by a free-radical mechanism in the presence of a phosphine as a chain transfer agent to obtain a polymer of the vinyl aromatic compound containing phosphorus in the polymer chains. U.S. Pat. No. 3,846,383, issued to Uyama et al., discloses a method for producing olefin-unsaturated acid copolymer wherein an olefin and an unsaturated acid anhydride are polymerized in the presence of a radical type polymerization catalyst. An effective amount of a molecular weight lowering agent is incorporated into the polymerization reaction mixture, whereby molecular weight of the copolymer is lowered.

U.S. Pat. No. 3,860,568, issued to Chabert et al., discloses a process for polymerizing olefinic monomer by contacting the monomer with a polymerization initiator having three components. The initiator comprises, in combination, (1) an oxidizing agent, (2) a chelate compound of a metal of Group IB, IIB, IVB, VB, VIB, VIIB, IIIA, IVA, VA, and VIII of the Periodic Table with at least one bidentate ligand, and (3) an electron donor in an amount at most equal to that required to complex completely the metal of the chelate compound.

It is an object of this invention to provide a process which uses cobalt(II) chelates of vicinal iminohydroxyimino- and dihydroxyiminoalkanes, N,N'-bis(-salicylidene)ethylenediamines and porphyrins which operate as highly efficient catalytic chain transfer agents for controlling styrene and acrylic homopolymer and copolymer molecular weights, some of which impart very little, if any, color to the final products, making them more useful in many applications, such as in paints and finishes. A further object is to provide such a process which uses, in conjunction with the chelate, a suitable Lewis base which will be defined hereinafter, which use offers a further means of controlling molecular weight. Another object is to provide such a process which proceeds at modest temperatures with limited amounts of initiator and in the absence of stoichiometrically-reacting chain transfer agents. These and other objects will become apparent hereinafter.

Some of the above objects have already been provided and are disclosed in commonly-assigned, United States patent application Ser. No. 707,367 which was filed Mar. 1, 1985, with the inventor herein being a joint inventor therein. More particularly, the application discloses and claims an improved free radical polymerization of acrylic and/or styrene monomers wherein molecular weight control is effected by means of a chain transfer agent, the improvement characterized in that the chain transfer agent is a cobalt chelate of the formula

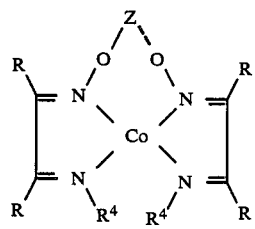
(IV)

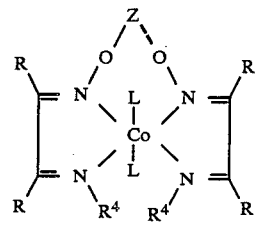
(V)

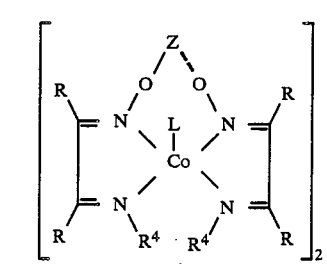
(Va)

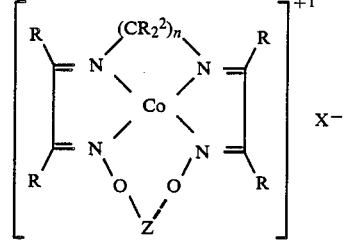
(VI)

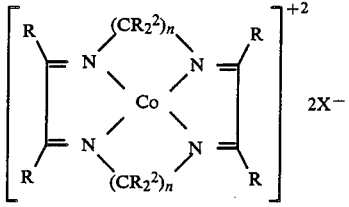
(VII)

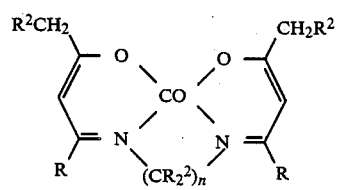
(VIII)

or (IX)

wherein each R, independently, is phenyl or $C_1$ to $C_{12}$alkyl wherein each α-carbon atom contains two hydrogen atoms, or R and R on adjacent carbon atoms, taken together, id $C_5$ to $C_8$ cycloalkylene, unsubstituted in the α-positions; $R^2$ is H or $C_xH_{2x+1}$ wherein x is 1 to 12; each $R^4$ is H or both $R^4$ groups taken together is —O—Z—O—; $R^7$ is O or NH; n is 2 or 3; Z is H, $BF_2$, $BCl_2$, $BBr_2$ or $BR_2^2$; $X^-$ is $NO_3\ hu\ -$, $Cl^-$, $Br^-$, $I^-$, $BF_4^-$, $PF_6^-$, $SbF_6^-$ or $R^1COO^-$ wherein $R^1$ is $C_1$ to $C_{12}$ alkyl; and L is

H₂O or (C₆H₅)₃P; provided, however, each of either or both aromatic rings in VIII optionally is substituted with a benzo group and optionally contains up to four substituents.

G. N. Schrauzer, Inorg. Syn., 11, 64 (1968), describes the preparation of diaqua bis(2,3-dihydroxyiminobutanato)-Co(II), see Example 1 herein.

SUMMARY OF THE INVENTION

The present invention provides an improved process for the free radical polymerization of acrylic and/or styrene monomers wherein molecular weight control is effected by means of a catalytic chain transfer agent. The improvement is characterized in that the polymerization is carried out in the presence of a Lewis base in admixture with a catalytic chain transfer agent, and said Lewis base is in an amount such that the molar ratio of base to cobalt chelate is greater than 2:1.

DETAILED DESCRIPTION OF THE INVENTION

This invention resides in styrene and acrylic polymerization processes employing a suitable Lewis base in admixture with a cobalt(II) chelate catalytic chain transfer agent for controlling the molecular weights of the styrene and acrylic homopolymers and copolymers produced. In addition to molecular weight control, the present process can be used to narrow molecular weight distribution in the resulting polymer. Control of molecular weight and the distribution thereof permits one to produce polymer or copolymer with useful physical properties, such as glass transition temperature, hardness, heat distortion temperature, and viscosity. For example, the present process can be used to produce low molecular weight polymer or copolymer with low viscosity and very little color which is useful for paints and finishes.

Polymer or copolymer produced by the present process contains unsaturated end groups. Such polymer or copolymer is referred to herein as "macromonomer". It has been found that macromonomer prepared in accordance with the present invention can be polymerized or copolymerized to form polymer or copolymer with desirable physical properties, such as high tensile strength, low viscosity, improved crystallinity and clarity. Macromonomers having from about 10 to about 1,000 units are preferred for paints and finishes, and most preferably, from about 100 to about 500 units.

In the present process, the suitable Lewis base enhances the effectiveness of the chain transfer agent and, therefore, less transfer agent can be used to effect the same degree of molecular weight control as with a larger amount of agent without the Lewis base. The Lewis bases which are useful herein are selected from phosphines, phosphites, amines, arsines and isonitriles. More specifically, the Lewis base is of the formula:

(1) $RR^1R^2P$ wherein each of $R^1$ and $R^2$, independently, is $C_{1-10}$ alkyl or $C_{5-10}$ cycloalkyl, provided, however, both of $R^1$ and $R^2$ are not methyl, and R is phenyl, optionally substituted with 1 to 5 substituents selected from $-R^3$, $-OR^3$, $-N(R^3)_2$, $-F$, $-Cl$, $-Br$, $-I$, $-NO_2$, $-COOH$, $-COOR^3$, $-CHO$ and $-C(O)R^3$ wherein $R^3$ is $C_{1-10}$ alkyl or $C_{5-10}$ cycloalkyl;

(2) $RRR^1P$ wherein $R^1$ is $C_{1-10}$ alkyl or $C_{5-10}$cycloalkyl and each R is phenyl optionally substituted with 1 to 5 substituents selected from $-R^3$, $-OR^3$, $-N(R^3)_2$, $-F$, $-Cl$, $-Br$, $-I$, $-NO_2$, $-COOH$, $-COOR^3$, $-CHO$ and $-C(O)R^3$ wherein $R^3$ is $C_{1-10}$ alkyl or $C_{5-10}$ cycloalkyl, provided, however, when all four ortho positions in the two phenyl groups are substituted, the substituent is $-F$ or $-CH_3$;

(3) $R^4R^5R^6P$ wherein:

(a) each of $R^4$, $R^5$ and $R^6$, independently, is phenyl or $(CH_2)_n$phenyl wherein n is 1 to 4 and each phenyl is optionally substituted with 1 to 4 substituents selected from $-R^3$, $-OR^3$, $-N(R^3)_2$, $-F$, $-Cl$, $-Br$, $-I$, $-NO_2$, $-COOH$, $-COOR^3$, $-CHO$ and $-C(O)R^3$ wherein $R^3$ is $C_{1-10}$ alkyl or $C_{5-10}$ cycloalkyl, provided, however, only one ortho position in each phenyl group is substituted and provided further, if all three phenyl groups are substituted in the ortho positions, the substituent is $-F$ or $-CH_3$; or (b) one of $R^4$, $R^5$ and $R^6$ is phenyl or $-(CH_2)_n$-phenyl, wherein n is 1 to 4, optionally substituted as in (a), and each of the other two, independently, is $C_{1-10}$ n-alkyl or $C_{5-10}$ cycloalkyl; or (c) each of $R^4$, $R^5$ and $R^6$, independently, is $C_{1-10}$ alkyl, provided, however, all three are not simultaneously n-alkyl or t-alkyl;

(4) $(R^1O)_3P$ wherein each $R^1$, independently, is $C_{1-10}$ alkyl or $C_{5-10}$ cycloalkyl, provided, however, all three are not simultaneously t-butyl;

(5) $(RO)_3P$ wherein each R is phenyl optionally substituted with 1 to 5 substituents selected from $-R^3$, $-OR^3$, $-N(R^3)_2$, $-F$, $-Cl$, $-Br$, $-I$, $-NO_2$, $-COOH$, $-COOR^3$, $-CHO$ and $-C(O)R^3$ wherein $R^3$ is $C_{1-10}$ alkyl or $C_{5-10}$ cycloalkyl, provided, however, all six ortho positions are not substituted, and provided further, each phenyl group is not substituted with one t-alkyl group in the ortho position;

(6) $(R(CH_2)_nO)_3P$ wherein n is 1 to 4 and R is phenyl optionally substituted with 1 to 5 substituents selected from $-R^3$, $-OR^3$, $-N(R^3)_2$, $-F$, $-Cl$, $-Br$, $-I$, $-NO_2$, $-COOH$, $-COOR^3$, $-CHO$ and $-C(O)R^3$ wherein $R^3$ is $C_{1-10}$ alkyl or $C_{5-10}$ cycloalkyl;

(7) $(R^7)_3N$ wherein $R^7$ is $C_{1-10}$ alkyl, $C_{5-10}$ cycloalkyl, or phenyl optionally substituted with 1 to 5 substituents selected from $-R^3$, $-OR^3$, $-N(R^3)_2$, $-F$, $-Cl$, $-Br$, $-I$, $-NO_2$, $-COOH$, $-COOR^3$, $-CHO$ and $-C(O)R^3$ wherein $R^3$ is $C_{1-10}$ alkyl or $C_{5-10}$ cycloalkyl, provided, however, all six ortho positions are not substituted, and provided further, each phenyl group is not substituted with one t-alkyl group in the ortho position;

(8) $(R^7)_3As$ wherein $R^7$ is $C_{1-10}$ alkyl, $C_{5-10}$ cycloalkyl, or phenyl optionally substituted with 1 to 5 substituents selected from $-R^3$, $-OR^3$, $-N(R^3)_2$, $-F$, $-Cl$, $-Br$, $-I$, $-NO_2$, $-COOH$, $-COOR^3$, $-CHO$ and $-C(O)R^3$ wherein $R^3$ is $C_{1-10}$ alkyl or $C_{5-10}$ cycloalkyl, provided, however, all six ortho positions are not substituted, and provided further, each phenyl group is not substituted with one t-alkyl group in the ortho position;

(9) $R^7N=C$ wherein $R^7$ is $C_{1-10}$ alkyl, $C_{5-10}$ cycloalkyl or phenyl optionally substituted with 1 to 5 substituents selected from $-R^3$, $-OR^3$, $-N(R^3)_2$, $-F$, $-Cl$, $-Br$, $-I$, $-NO_2$, $-COOH$, $-COOR^3$, $-CHO$ and $-C(O)R^3$ wherein $R^3$ is $C_{1-10}$ alkyl or $C_{5-10}$ cycloalkyl;

(10) $C_5H_5N$ (pyridine), optionally substituted with 1 to 5 substituents selected from $-R^3$, $-OR^3$, $-N(R^3)_2$, —F, —Cl, —Br, —I, —NO$_2$, phenyl, —COOH, —COOR$^3$, —CHO and —C(O)R$^3$ wherein R$^3$ is C$_{1-10}$ alkyl or C$_{5-10}$ cycloalkyl; or

(11) (C$_6$F$_5$)P.

Examples of Lewis bases which are useful herein include C$_5$H$_5$N, (CH$_3$CH$_2$)$_3$N, (C$_6$H$_5$)$_3$P, (C$_6$R$_5$)$_3$P, (C$_6$H$_5$)$_2$(CH$_3$)P, (C$_6$H$_5$CH$_2$)$_3$P, [(CH$_3$)$_2$CH]$_3$P, (o- and p-CH$_3$C$_6$H$_4$)$_3$P, (p-CH$_3$OC$_6$H$_4$)$_3$P, (p-FC$_6$H$_4$)$_3$P, CH$_3$O)$_3$P, (C$_6$H$_5$O)$_3$P, (o-C$_6$H$_5$C$_5$H$_4$O)$_3$P, (o-CH$_3$C$_6$H$_4$O)$_3$P, [(CH$_3$)$_2$C(H)O]$_3$P, (p-ClC$_6$H$_4$)$_3$P, (p-FC$_6$H$_4$)$_3$P, (C$_6$H$_5$)$_3$As and (CH$_3$)$_3$CN=C. Preferred from this group of bases are C$_5$H$_5$N, (C$_6$H$_5$CH$_2$)$_3$P, (C$_6$F$_5$)$_3$P, (o-CH$_3$C$_6$H$_4$)$_3$P, (o-C$_6$H$_5$C$_6$H$_4$O)$_3$P, (o-CH$_3$C$_6$H$_4$O)$_3$P and (C$_6$H$_5$)$_3$As. Especially preferred are (C$_6$H$_5$)$_3$P, (C$_6$H$_5$)$_2$(CH$_3$)P, [(CH$_3$)$_2$CH]$_3$P, (CH$_3$O)$_3$P, (C$_6$H$_5$O)$_3$P, (p-CH$_3$C$_6$H$_4$)$_3$P, (p-CH$_3$OC$_6$H$_4$)$_3$P, [(CH$_3$)$_2$C(H)O]$_3$P, (p-ClC$_6$H$_4$)$_3$P, (p-FC$_6$H$_4$)$_3$P, (CH$_3$CH$_2$)$_3$N and (CH$_3$)$_3$CN=C. The amount of base which is used in the process of the invention is such that the molar ratio of base to cobalt chelate is greater than 2:1, for example, within the range greater than 2:1 to about 25,000:1. It has been discovered that the polymerization can be carried out with even a very large excess of base. This is demonstrated in Example 1 wherein a base to chain transfer agent ratio of 250,000:1 was used. However, such amounts exceed the amounts at which the base enhancement advantages of the invention are realized.

The cobalt chelates consist of cobalt(II) coordinated to the ligands: vicinal iminohydroxyimino and dihydroxyiminoalkanes (I), N,N'-bis(salicylidene)-ethylenediamines (II) and porphyrins (III). By "ligand" as the term is used herein is meant any atom, radical or molecule which can bind to a characteristic or central element of a complex. The structures of the aforesaid ligands are given below.

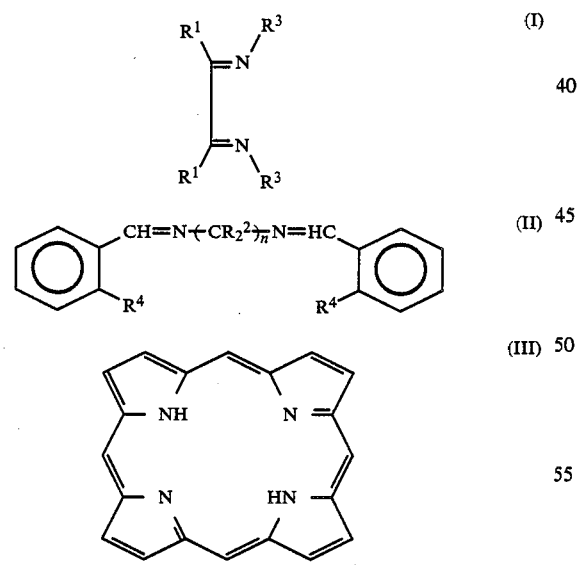

In the aforesaid formulas each R$^1$, independently, is phenyl or C$_1$ to C$_{12}$ alkyl wherein each α-carbon atom contains two hydrogen atoms, that is, is unsubstituted, or both R$^1$ groups taken together is C$_5$ to C$_8$cycloalkylene, unsubstituted in the α-positions; R$^2$ is H or C$_x$H$_{2x+1}$ wherein x is 1 to 12; each R$^3$, independently, is H or OH, with at least one being OH; R$^4$ is OH or NH$_2$; and n is 2 or 3. Further regarding structure II, each of either or both aromatic rings can be unsubstituted or substituted with up to four substituents that are compatible with the use of this complex herein as a chain transfer agent. Examples of such substituents include —OR$^2$, —NR$^2{}_2$, —Cl, —Br, —I, —NO$_2$ and —R$^5$ wherein R$^5$ is C$_x$H$_{2x+1}$ wherein x is 1 to 12. In addition, each of either or both aromatic rings can be substituted with a benzo group so as to form a naphthalene derivative. Preferably, the porphyrin structure III is substituted with one or more substituents that are compatible with the use of this complex herein as a chain transfer agent. Such substituents include alkyl and aryl substituents, such as ethyl and phenyl, these being demonstrated in Examples 13 and 14. Preferred porphyrins are of the formula

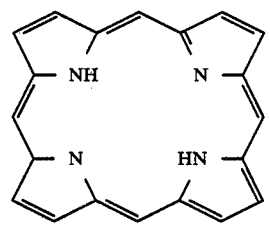

of positions 1 to 12 in the nucleus are substituted with substituents selected from —R$^3$, —CH=C(R$^3$)$_2$, —(CH$_2$)$_n$—COOH, wherein n is 1 to 10 and M is H or R$^3$, and phenyl, optionally substituted with 1 to 5 substituents selected from —R$^3$, —OR$^3$, —N(R$^3$)$_2$, —F, —Cl, —Br, —I, —NO$_2$, —COOH, —COOR$^3$, —CHO and —C(O)R$^3$ wherein R$^3$ is C$_{1-10}$ alkyl or C$_{5-10}$ cycloalkyl. The corresponding structures for the cobalt chelates of the ligands are given below. More specifically, the corresponding cobalt chelates of structures I, II and III are, respectively, IV, V and VI.

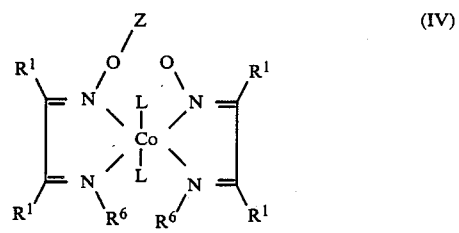

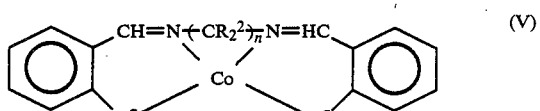

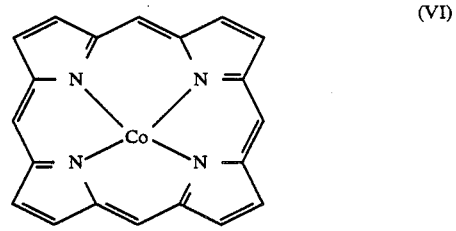

In formulas IV, V and VI, R$^1$, R$^2$ and n are as defined above; each R$^6$ is H or both R$^6$ groups taken together is —O—Z—O—; each R$^7$ is either O or NH; Z is H, BF$_2$, BCl$_2$, BBr$_2$ or BR$_2{}^2$; and L is

, H₂O or (C₆H₅)₃P. The cobalt complex V is referred to in Example 3 as [Co(II)Salen].

The cobalt chelates of structures IV, V and VI can be prepared by reacting Co(II)X₂ and I, II and III, respectively. As will be apparent to one skilled in the art, these chelated also can be prepared in situ by adding the cobalt salt and the ligand, as separate components, to a mixture of solvent, monomer and initiator prior to applying heat. Alternatively, the complex can be prepared and stored as a standard solution for subsequent addition to the mixture to be polymerized. For such standard solutions the cobalt(II) salt can be in the form of the nitrate, chloride, bromide or iodide, either as hydrated or anhydrous, or as an alkanoate, the lower ($C_2$-$C_3$) alkanoates being soluble in methanol or ethanol, the higher ($C_4$-$C_8$) alkanoates providing a means of preparing the standard solutions in hydrocarbon solvents.

The analogous cobalt(III) complexes can be used in the process of this invention if the cobalt(III) can easily be reduced to cobalt(II) by reaction with the free radicals produced by the initiator. This permits the in situ production of the cobalt(II) complexes of the invention. Preferred catalytic chain transfer agents include diaqua-bis[2,3-dihydroxyiminobutanato]Co(II), referred to herein also as [Co(II)(DHIB-H)₂(H₂O)₂], and N,N'-bis(-salicylidene)ethylenediamino Co(II), referred to herein as [Co(II)Salen], a commercially available material. The former is more preferred.

Many common organic solvents are suitable as polymerization media, although use of such a solvent is not essential. These include aromatic hydrocarbons, such as benzene, toluene and the xylenes; ethers, such as tetrahydrofuran, diethyl ether and the commonly available ethylene glycol and polyethylene glycol monoalkyl and dialkyl ethers, including the Cellosolves and Carbitols ; alkyl esters of acetic, propionic and butyric acids; and mixed ester-ethers, such as monoalkyl ether-monoalkanoate esters of ethylene glycol; ketones, such as acetone, butanone, pentanone and hexanone; and alcohols, such as methanol, ethanol, propanol and butanol. In some instances, it may be advantageous to use mixtures of two or more solvents.

The polymerization is carried out at the reflux temperature of the solvent, generally in the range 50°–150° C. The preferred range is 65°–110° C.

To ensure maximum catalyst activity the polymerizations should be carried out in the substantial absence of oxygen under an inert atmosphere, such as nitrogen, argon or other non-oxidizing gas. "Deaeration", as the term is used herein, means the substantial removal of oxygen.

Any of the known class of azo polymerization initiators is suitable provided it has requisite solubility in the solvent or monomer mixture chosen and has an appropriate half life at the temperature of polymerization. Typical of such initiators, but not restricted to them, are azocumene; 2,2'-azobis(isobutyronitrile); 2,2'-azobis(2-methyl)butanenitrile; and 2-(t-butylazo)-2-cyanopropane.

In free radical polymerizations, the molecular weight of the polymer product will depend on several factors, including:

1. the monomer/initiator molar ratio (M/I);
2. the boiling point of the reaction medium;
3. the inherent chain transfer activity of the solvent; and
4. the relative rates of initiation and propagation.

In the invention herein, other factors, such as the relative activity of the catalyst and the catalyst/initiator molar ratio, become important and, in fact, dominating.

The process of the invention generally is carried out as a batch process in accordance with techniques which are well known to one skilled in the art. Such techniques are demonstrated in the examples. As a further demonstration of batch process techniques, the reactor can be charged with solvent and monomer (or a mixture of comonomers), with the mixture being stirred under an inert atmosphere (such as nitrogen, argon or helium), at room temperature, for example, for a minimum of one-half hour to ensure deaeration, that is, the substantial removal of oxygen. To the mixture can be then added the requisite amount of initiator, typically such that M/I is 100 to 200. When the initiator has dissolved, the catalyst solution can be injected in or, alternatively, the catalyst can be formed in situ by adding the components thereof, ligand and the appropriate cobalt(II) compound. In some cases the catalyst can be added in solid form if the chelate has previously been isolated as such. In typical examples, it is added in amount such that the catalyst/initiator ratio C/I is in the range 0.005–0.060. The base is added at any appropriate stage of the operation. After all additions have been completed, the mixture is heated to boiling and refluxed for the requisite time, usually one-half hour to six hours.

Upon completion of polymerization the polymer is isolated by stripping off solvent and unreacted monomer or by precipitation with a nonsolvent. Alternatively, the polymer solution can be used as such if appropriate to its application.

The process of the invention is carried out most effectively with styrene and methacrylate ester monomers, but acrylate esters can be included as comonomers with the methacrylate esters and/or styrene, without diminution of the advantages of the invention process. Methacrylates which are useful in this invention include branched alkyl or n-alkyl esters of $C_{1-12}$ alcohols and methacrylic acid, for example, methyl and ethyl methacrylate. Other monomers include, but are not restricted to, allyl, glycidyl, hydroxyalkyl (for example, hydroxyethyl and hydroxypropyl), allyloxyethyl, 2,4-hesadienyl (sorbyl) and dialkylaminoalkyl methacrylates.

In the following examples which demonstrate the process of the invention, all temperatures are in degrees Celsius. The examples include experiments, for comparison, wherein the molar ratio of Lewis base to cobalt chelate is not greater than 2:1. Such experiments are outside the invention. These are noted by an asterisk. The precision for the molecular weights shown in the tables for the examples is ±5%.

EXAMPLE 1

A. Preparation of [Co(II)(DHIB-H)₂(H₂O)₂]

The following procedure was carried out in a dry box under an atmosphere of nitrogen.

Methanol (15 mL) was added to a round bottom flask equipped with a small magnetic stirring bar. Cobalt(II) acetate tetrahydrate (1.0 g, 0.004 mol) and 0.932 g (0.008 mol) of 2,3-dihydroxyiminobutane were added to the methanol. The flask as closed and the solution was stirred for one hour. The orange-brown solid [Co-(II)(DHIB-H)$_2$(H$_2$O)$_2$] was collected by filtration, washed with methanol and dried; yield was 1.158 g (89%). A stock solution was prepared by adding 0.050 g of the product to 250 mL of methanol to give a concentration of $6.0 \times 10^{-4}$ M.

B. Use of [Co(II)(DHIB-H)$_2$(H$_2$O)$_2$] in Admixture with Pyridine in the Free Radical Polymerization of Methyl Methacrylate In a nitrogen drybox, 21.4 mL (0.2 mol) of methyl methacrylate, which had been previously sparged with nitrogen and passed through a column of Woelm alumina (grade 1), was added to a 100 mL volumetric flask. To this was added 1.o mL of the catalyst solution ($6 \times 10^{-7}$ mol of catalyst) from Part A and the volume was brought to 100 mL with distilled methanol.

To a 300 mL round bottom flask was added 62 mg ($2.5 \times 10^{-4}$ mol) of 2,2'-azobis(2-methyl-butanenitrile, the contents of the volumetric flask and the desired amount of pyridine (see Table 1 wherein the pyridine is shown in terms of the concentration of the solution (in molarity) after addition of the pyridine). The reaction mixture was then stirred to dissolve the 2,2'-azobis (2-methyl)butanenitrile and a gas chromatography (G.C.) sample was taken. The round bottom flask was capped with a water-cooled condenser, brought out of the drybox and heated to reflux under nitrogen for six hours. The reaction mixture was then allowed to cool to room temperature and another G.C. sample was taken. The poly(methyl methacrylate) was isolated by removing solvent and unreacted monomer from the reaction mixture via a rotary evaporator. The results are shown in Table 1. A control experiment was carried out without pyridine. The same experiment, with the results shown, is disclosed at the end of Example 3.

TABLE 1

| [C$_5$H$_5$N] | [C$_5$H$_5$N]/Catalyst | $\overline{M}_n$ | $\overline{M}_w$ | $\overline{M}_w/\overline{M}_n$ |
|---|---|---|---|---|
| $6.0 \times 10^{-6}$ M | 1.0* | 39500 | 82100 | 2.08 |
| $6.0 \times 10^{-5}$ M | 10.0 | 14300 | 30600 | 2.14 |
| $6.0 \times 10^{-4}$ M | 100.0 | 21500 | 44200 | 2.06 |
| $3.0 \times 10^{-3}$ M | 500.0 | 1910 | 12200 | 6.39 |
| $1.5 \times 10^{-2}$ M | 2500.0 | 426 | 856 | 2.01 |
| $1.5 \times 10^{-1}$ M | 25,000.0 | 295 | 487 | 1.65 |
| 1.5 M | 250,000.0 | 370 | 670 | 1.81 |

EXAMPLE 2

Use of [Co(II)(DHIB-H)$_2$(H$_2$O)$_2$] in Admixture with Triphenylphosphine in the Free Radical Polymerization of Methyl Methacrylate The procedure of Example 1B was substantially repeated with triphenylphosphine in place of pyridine. The results are shown in Table 2.

TABLE 2

| [(C$_6$H$_5$)$_3$P] | [(C$_6$H$_5$)$_3$P]/Catalyst | $\overline{M}_n$ | $\overline{M}_w$ |
|---|---|---|---|
| $1.5 \times 10^{-6}$ M | 0.25* | 34600 | 85600 |
| $3.0 \times 10^{-6}$ M | 0.50* | 31200 | 64800 |
| $6.0 \times 10^{-6}$ M | 1.00* | 24600 | 56800 |
| $6.0 \times 10^{-5}$ M | 10.00 | 7340 | 23100 |

TABLE 2-continued

| [(C$_6$H$_5$)$_3$P] | [(C$_6$H$_5$)$_3$P]/Catalyst | $\overline{M}_n$ | $\overline{M}_w$ |
|---|---|---|---|
| $3.0 \times 10^{-4}$ M | 50.00 | 928 | 1600 |
| $1.5 \times 10^{-3}$ M | 250.00 | 363 | 699 |

A control experiment carried out without triphenylphosphine gave polymer with $\overline{M}_n$ 41400 and $\overline{M}_w$ 107000.

EXAMPLE 3

Use of [Co(II)Salen] in Admixture with Triphenylphosphine in the Free Radical Polymerization of Methyl Methacrylate The procedure of Example 1B was substantially repeated using [Co(II)Salen], a commercially available material, in place of [Co(II)(DHIB-H)$_2$(H$_2$O)$_2$], at a concentration of $6.0 \times 10^{-5}$ M (solution molarity), and triphenylphosphine in place of pyridine. The results are shown in Table 3.

TABLE 3

| [(C$_6$H$_5$)$_3$P] | [(C$_6$H$_5$)$_3$P]/Catalyst | $\overline{M}_n$ | $\overline{M}_w$ |
|---|---|---|---|
| $1.14 \times 10^{-4}$ M | 1.9* | 20000 | 35800 |
| $5.72 \times 10^{-4}$ M | 9.5 | 19600 | 33900 |
| $5.72 \times 10^{-3}$ M | 95.3 | 15600 | 29700 |

EXAMPLES 4-12

Use of [Co(II)(DHIB-H)$_2$(H$_2$O)$_2$] in Admixture with Various Bases in the Free Radical Polymerization of Methyl Methacrylate The procedure of Example 1B was substantially repeated using various bases of the invention in place of pyridine. The results for Examples 4-12 are shown, respectively, in Tables 4-12.

TABLE 4

| (CH$_3$CH$_2$)$_3$N | $\overline{M}_n$ | $\overline{M}_w$ | $\overline{M}_w/\overline{M}_n$ |
|---|---|---|---|
| $1.5 \times 10^{-6}$ M* | 30700 | 69600 | 2.27 |
| $6.0 \times 10^{-6}$ M* | 33800 | 75700 | 2.24 |
| $6.0 \times 10^{-5}$ M | 19000 | 42300 | 2.23 |
| $3.0 \times 10^{-4}$ M | 2950 | 5620 | 1.91 |

TABLE 5

| (C$_6$H$_5$)$_2$(CH$_3$)P | $\overline{M}_n$ | $\overline{M}_w$ | $\overline{M}_w/\overline{M}_n$ |
|---|---|---|---|
| $1.5 \times 10^{-6}$ M* | 44900 | 112000 | 2.49 |
| $6.0 \times 10^{-6}$ M* | 24300 | 63900 | 2.63 |
| $6.0 \times 10^{-5}$ M | 430 | 803 | 1.87 |
| $3.0 \times 10^{-4}$ M | 308 | 482 | 1.56 |

TABLE 6

| (C$_6$H$_5$CH$_2$)$_3$P | $\overline{M}_n$ | $\overline{M}_w$ | $\overline{M}_w/\overline{M}_n$ |
|---|---|---|---|
| $1.5 \times 10^{-6}$ M* | 36200 | 97000 | 2.68 |
| $6.0 \times 10^{-6}$ M* | 45600 | 100000 | 2.19 |
| $6.0 \times 10^{-5}$ M | 35700 | 75400 | 2.11 |
| $3.0 \times 10^{-4}$ M | 15500 | 32900 | 2.12 |

TABLE 7

| [(CH$_3$)$_2$CH]$_3$P | $\overline{M}_n$ | $\overline{M}_w$ | $\overline{M}_w/\overline{M}_n$ |
|---|---|---|---|
| $1.5 \times 10^{-6}$ M* | 39700 | 91900 | 2.31 |
| $6.0 \times 10^{-6}$ M* | 40900 | 94100 | 2.30 |
| $6.0 \times 10^{-5}$ M | 40200 | 86900 | 2.16 |
| $3.0 \times 10^{-4}$ M | 35300 | 74500 | 2.11 |

TABLE 8

| $(p\text{-}CH_3C_6H_4)_3P$ | $\overline{M}_n$ | $\overline{M}_w$ | $\overline{M}_w/\overline{M}_n$ |
|---|---|---|---|
| $1.5 \times 10^{-6}$ M* | 31100 | 68700 | 2.21 |
| $6.0 \times 10^{-6}$ M* | 26000 | 53000 | 2.04 |
| $6.0 \times 10^{-5}$ M | 4260 | 9900 | 2.32 |
| $3.0 \times 10^{-4}$ M | 662 | 1400 | 2.11 |

TABLE 9

| $(p\text{-}CH_3OC_6H_4)_3P$ | $\overline{M}_n$ | $\overline{M}_w$ | $\overline{M}_w/\overline{M}_n$ |
|---|---|---|---|
| $1.5 \times 10^{-6}$ M* | 45500 | 98500 | 2.16 |
| $6.0 \times 10^{-6}$ M* | 46600 | 102000 | 2.19 |
| $6.0 \times 10^{-5}$ M | 18000 | 38900 | 2.16 |
| $3.0 \times 10^{-4}$ M | 1360 | 2880 | 2.12 |

TABLE 10

| $(p\text{-}FC_6H_4)_3P$ | $\overline{M}_n$ | $\overline{M}_w$ | $\overline{M}_w/\overline{M}_n$ |
|---|---|---|---|
| $1.5 \times 10^{-6}$ M* | 43200 | 92200 | 2.13 |
| $6.0 \times 10^{-6}$ M* | 38100 | 74400 | 1.95 |
| $6.0 \times 10^{-5}$ M | 2920 | 6350 | 2.17 |
| $3.0 \times 10^{-4}$ M | 891 | 1820 | 2.04 |

TABLE 11

| $(CH_3O)_3P$ | $\overline{M}_n$ | $\overline{M}_w$ | $\overline{M}_w/\overline{M}_n$ |
|---|---|---|---|
| $1.5 \times 10^{-6}$ M* | 13000 | 25500 | 1.96 |
| $6.0 \times 10^{-6}$ M* | 5770 | 17500 | 3.03 |
| $6.0 \times 10^{-5}$ M | 917 | 2320 | 2.53 |
| $3.0 \times 10^{-4}$ M | 746 | 1730 | 2.32 |

TABLE 12

| $(C_6H_5O)_3P$ | $\overline{M}_n$ | $\overline{M}_w$ | $\overline{M}_w/\overline{M}_n$ |
|---|---|---|---|
| $1.5 \times 10^{-6}$ M* | 39200 | 84500 | 2.16 |
| $6.0 \times 10^{-6}$ M* | 41400 | 86500 | 2.09 |
| $6.0 \times 10^{-5}$ M | 18900 | 49100 | 2.60 |
| $3.0 \times 10^{-4}$ M | 2770 | 9800 | 3.54 |

EXAMPLE 13

Use of [Co(II)OEP] in Admixture with Triphenylphosphine in the Free Radical Polymerization of Methyl Methacrylate A saturated stock solution was made by adding 15 mg of commercially available [Co(II)OEP], wherein OEP is octaethylporphyrin, to 100 mL of methanol. A small amount of the solid additive remained undissolved. The procedure of Example 1B was substantially repeated using the stock solution as catalyst and using various bases of the invention. The results for Example 13 are shown in Table 13.

TABLE 13

| $(C_6H_5)_3P$ | $\overline{M}_n$ | $\overline{M}_w$ | $\overline{M}_w/\overline{M}_n$ |
|---|---|---|---|
| $1.5 \times 10^{-6}$ M* | 43800 | 105000 | 2.40 |
| $6.0 \times 10^{-6}$ M* | 22200 | 47300 | 2.13 |
| $6.0 \times 10^{-5}$ M | 22800 | 44500 | 1.95 |
| $3.0 \times 10^{-4}$ M | 14800 | 26600 | 1.80 |

A control experiment carried out without the [Co(II)OEP] base provided poly(methyl methacrylate): $\overline{M}_n$ 47300, $\overline{M}_w$ 127000, $\overline{M}_w/\overline{M}_n$ 2.68.

Another experiment carried out with pyridine in place of triphenylphosphine failed to demonstrate the anticipated improved molecular weight control, showing the criticality of using the proper combination of Lewis base and catalyst.

EXAMPLE 14

Use of [Co(II)TPP] in Admixture with Triphenylphosphine in the Free Radical Polymerization of Methyl Methacrylate A saturated stock solution was made by adding 17 mg of commercially available [Co(II)TPP], wherein TTP is tetraphenylporphyrin, to 100 mL of methanol. A small amount of the solid additive remained undissolved. The procedure of Example 1B was substantially repeated using the stock solution as catalyst and using triphenylphosphine in place of pyridine. The results are shown in Table 14.

TABLE 14

| $(C_6H_5)_3P$ | $\overline{M}_n$ | $\overline{M}_w$ | $\overline{M}_w/\overline{M}_n$ |
|---|---|---|---|
| $1.5 \times 10^{-6}$ M* | 22500 | 48600 | 2.16 |
| $6.0 \times 10^{-6}$ M* | 16900 | 38500 | 2.28 |
| $6.0 \times 10^{-5}$ M | 10200 | 20000 | 1.96 |
| $3.0 \times 10^{-4}$ M | 6310 | 12800 | 2.03 |

A control experiment carried out without the [Co(II)TPP] triphenylphosphine provided poly(methyl methacrylate): $\overline{M}_n$ 38300, $\overline{M}_w$ 76300, $\overline{M}_w/\overline{M}_n$ 1.99.

EXAMPLE 15

Use of [Co(II)(DHIB-H)$_2$(H$_2$O)$_2$] in Admixture with Triphenylphosphine in the Free Radical Polymerization of Methyl Methacrylate In a nitrogen drybox, 21,4 mL (0.2 mol) of methyl methacrylate, which had been previously sparged with nitrogen and passed through a column of Woelm alumina (grade 1), was added to a 100 mL volumetric flask. To this was added 1.0 mL of a $6 \times 10^{-4}$ M solution of [Co(II)(DHIB-H)$_2$(H$_2$O)$_2$] in methanol and the volume of the resulting combination was brought to 100 mL with distilled methanol.

To a 300 mL round bottom flask was added 62 mg ($2.5 \times 10^{-4}$ mol) of 2,2'-azobis(2-methyl)butanenitrile, the contents of the volumetric flask and the amount of triphenylphosphine specified in Table 15 (wherein the triphenylphosphine is shown in terms of the concentration of the solution (in molarity) after addition of the triphenylphosphine). The concentration of [Co(II)(DHIB-H)$_2$(H$_2$O)$_2$] in the resulting reaction mixture was $6.0 \times 10^{-6}$ M. The reaction mixture was then stirred to dissolve the 2,2'-azobis(2-methyl)butanenitrile and a gas chromatography (G.C.) sample was taken. The round bottom flask was capped with a water-cooled condenser, brought out of the drybox and heated to reflux under nitrogen for six hours. The reaction mixture was then allowed to cool to room temperature and another G.C. sample was taken. The poly(methyl methacrylate) was isolated by removing solvent and unreacted monomer from the reaction mixture via a rotary evaporator. The results are shown in Table 15.

TABLE 15

| Polymerization with [Co(II)(DHIB-H)$_2$(H$_2$O)$_2$] | | |
|---|---|---|
| $(C_6H_5)_3P$ | $\overline{M}_n$ | $\overline{M}_w$ |
| 0 | 41,400 | 107,000 |
| $6.0 \times 10^{-6}$ M | 24,600 | 56,800 |
| $6.0 \times 10^{-5}$ M | 7,340 | 23,100 |
| $3.0 \times 10^{-4}$ M | 928 | 1,600 |
| $1.5 \times 10^{-3}$ M | 393 | 699 |

The procedure described above was substantially repeated except that no [Co(II)(DHIB-H)₂(H₂O)₂] was employed. The results are shown in Table 16.

TABLE 16

| Polymerization without [Co(II)(DHIB-H)₂(H₂O)₂] | | |
|---|---|---|
| (C₆H₅)₃P | $\overline{M}_n$ | $\overline{M}_w$ |
| 6.0 × 10⁻⁶ M | 51,700 | 126,000 |
| 6.0 × 10⁻⁵ M | 35,300 | 94,300 |
| 3.0 × 10⁻⁴ M | 41,200 | 97,400 |
| 1.5 × 10⁻³ M | 40,100 | 87,400 |

This example shows that polymerization employing [Co(II)(DHIB-H)₂(H₂O)₂] at a concentration of 6.0×10⁻⁶ M gave polymeric product with a $\overline{M}_n$ of 41,400 and a $\overline{M}_w$ of 107,000 and polymerization employing (C₆H₅)₃P at a concentration of 1.5×10₋₃ M gave a polymeric product with a $\overline{M}_n$ of 40,100 and a $\overline{M}_w$ of 87,400. A combination of {Co(II)(DHIB-H)₂(H₂O)₂] and (C₆H₅)₃P at the specified concentrations gave polymeric product with a $\overline{M}_n$ of 393 and a $\overline{M}_w$ of 699. Thus, substantially less cobalt chelate is required to effect the same degree of molecular weight control when it is employed in combination with a Lewis base.

BEST MODE FOR CARRYING OUT THE INVENTION

The best mode presently contemplated for carrying out the invention if represented by the disclosure and claims herein.

What is claimed is:

1. In an improved free radical polymerization of acrylic and/or styrene monomers wherein molecular weight control is effected by means of a catalytic chain transfer agent, the improvement characterized in that the polymerization is initiated by an azo initiator and carried out either in the presence of at least one solvent selected from the group consisting of methanol, ethanol, propanol and butanol, or in the absence of any solvent and further in the presence of a Lewis base in admixture with a catalytic chain transfer agent which is the cobalt chelate of the formula

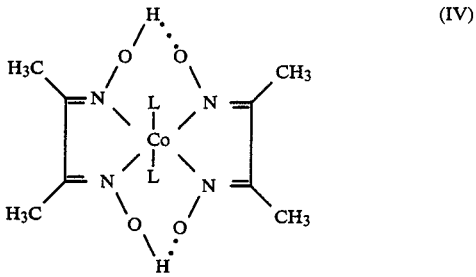

L is

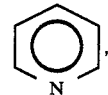

H₂O or (C₆H₅)₃P]; the Lewis base being of the formula R⁴·R⁵R⁶P wherein each of R⁴, R⁵ and R⁶, independently, is phenyl optionally substituted with 1 to 4 substituents selected from —R³, —OR³, —N(R³)₂, —F, —Cl, —Br, —I, —NO₂, —COOH, —COOR³, —CHO and —C(O)R³ wherein R³ is C₁₋₁₀ alkyl or C₅₋₁₀ cycloalkyl, provided, however, only one ortho position in each phenyl group is substituted, and provided further, if all three phenyl groups are substituted in the ortho positions, the substituent is —F or —CH₃; said Lewis base being in an amount such that the molar ratio of base to cobalt chelate is greater than 2:1, but less than or equal to 250:1.

2. Process of claim 1 wherein the Lewis base is (C₆H₅)₃P.

3. Process of claim 1 wherein the molar ratio of Lewis base to chain transfer agent is from 10:1 to about 250:1.

4. Process of claim 3 wherein the solvent is methanol.

5. Process of claim 4 which is carried out at the reflux temperature of the solvent.

6. Process of claim 5 which is carried out at 50°–150° C.

7. Process of claim 5 which is carried out at 65°–110° C.

8. Process of claim 1 wherein a single monomer is homopolymerized.

9. Process of claim 8 wherein the monomer is methyl methacrylate.

10. Process of claim 8 wherein the monomer is styrene.

11. Process of claim 1 wherein a mixture of comonomers is copolymerized.

12. Process of claim 11 wherein the mixture includes methyl methacrylate.

13. Process of claim 11 wherein the mixture includes styrene.

* * * * *